UNITED STATES PATENT OFFICE.

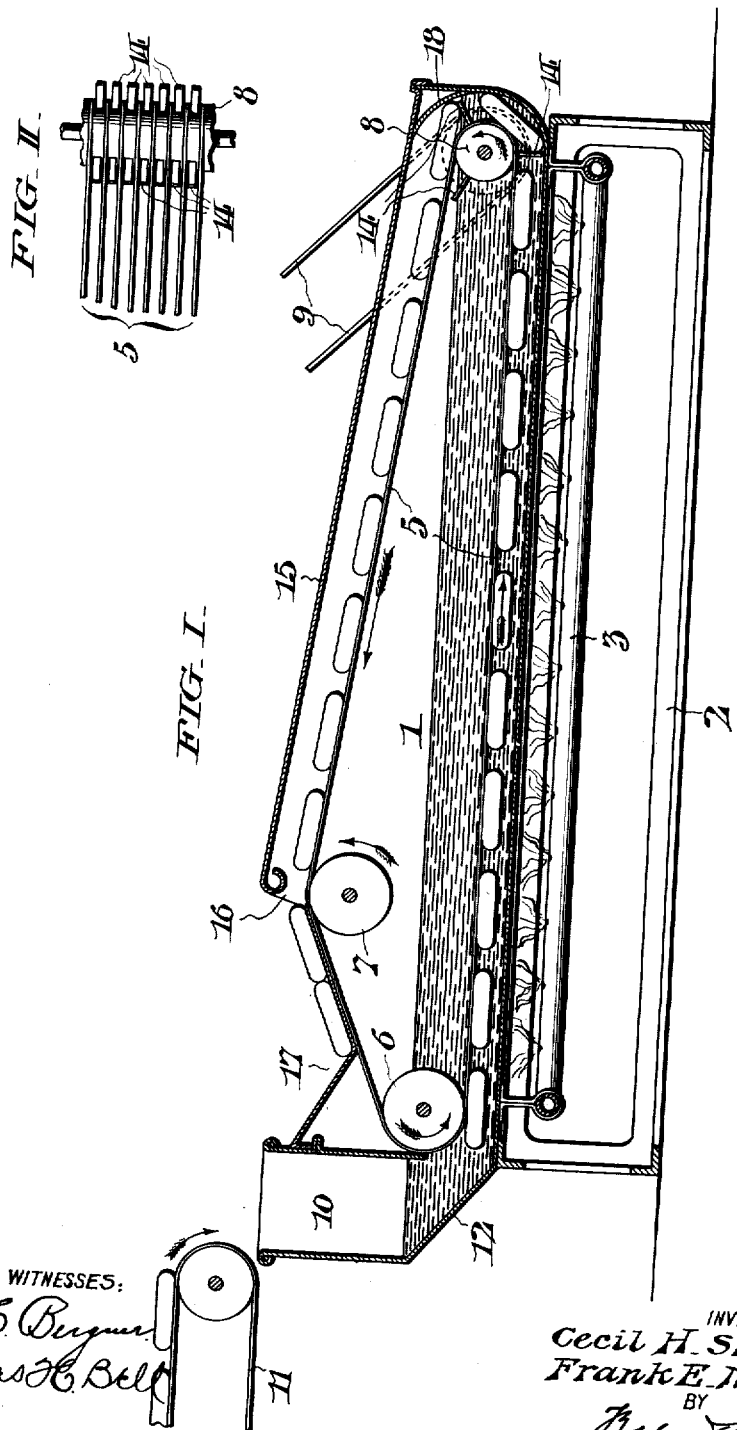

CECIL H. SHERMAN AND FRANK ELLIS MORRIS, OF PHILADELPHIA, PENNSYLVANIA; SAID SHERMAN ASSIGNOR, BY MESNE ASSIGNMENTS, OF HIS ENTIRE RIGHT TO JOHN C. BERGNER, OF PHILADELPHIA, PENNSYLVANIA.

COOKING APPARATUS.

1,414,713.      Specification of Letters Patent.      Patented May 2, 1922.

Application filed June 7, 1919. Serial No. 302,386.

*To all whom it may concern:*

Be it known that we, CECIL H. SHERMAN and FRANK E. MORRIS, citizens of the United States of America, and residents of Philadelphia, in the county of Philadelphia and State of Pennsylvania, have invented certain new and useful Improvements in Cooking Apparatus, whereof the following is a specification, reference being had to the accompanying drawings.

The invention relates to cooking apparatus wherein cooking is accomplished by aid of a heated fluid.

The invention is more particularly directed to an apparatus of the above type, wherein the articles to be cooked are progressed through the cooking fluid, preferably whilst immersed therein, and discharged after the cooking operation has been completed.

Our invention also embraces various devices and combinations of parts in themselves useful for cooking purposes.

We have hereinafter illustrated and described in detail an apparatus which is the best embodiment of our invention at present known to us, and which not only cooks the articles supplied to it effectually while traveling submerged in a cooking liquid, but also provides for freeing the articles from any adherent liquid while kept hot so as to promote the necessary free flow and drainage of said liquid. The apparatus shown comprises a trough or pan for the cooking fluid; an endless belt running partly below and partly above the level of the cooking fluid; means for directing the articles to be cooked beneath the submerged portion of the belt after which contact with the latter is maintained by virtue of the buoyancy of the articles; and means for subsequently directing the articles to the portion of the belt running above the fluid to permit draining preparatory to discharge from the apparatus. It will be understood, however, that while our invention extends to these and other specific features and details hereinafter illustrated, yet it is not, in its broader aspects, confined thereto,—its scope and essentials in its various phases being indicated in our claims.

Referring to the drawings, Fig. I, is a longitudinal sectional view through a cooking apparatus conveniently illustrating our invention, and Fig. II, is a detail in plan of a portion of the mechanism by which the articles to be cooked are progressed through the apparatus.

As herein shown, the apparatus comprises a trough or pan 1, which serves as a container or receptacle, for a cooking fluid, and is supported by a frame, or standard 2. The cooking fluid may be water, liquor or grease, or other solution, depending on the nature of the cooking which is to be effected. The cooking fluid may be heated in any approved manner. For convenience of illustration a gas burner 3, has been diagrammatically represented in the drawing. Such burner may be of tubular form as shown, and provided with a series of jets so that the heat is evenly distributed over the bottom of the trough.

In the course of the cooking operation, the articles are slowly progressed whilst immersed in the cooking fluid by the lower or horizontal run of an endless belt 5. The loaded travel of this belt, it will be seen, includes not only such a course below the level of the cooking fluid, but also an upward course extending out of and above the fluid. As best shown in Fig. II, this belt consists of a series of spaced strands running about grooved guide rolls or drums 6, 7, and 8, of which the latter serves as a driver, it being directly connected, for example, by a belt 9, with any convenient source of power. As shown, the drum 7, is at a higher elevation than its fellows, so that the inclined upper run of the belt extends above the level of the cooking fluid, for a purpose which will be later explained herein.

At its left hand end, the trough is provided with an inlet 10, through which the articles to be cooked may be introduced into the fluid, either dropped by hand, or by a delivery conveyer such as represented diagrammatically at 11. The receiving end of the trough is preferably shaped as at 12, so as to assist the articles beneath the drum 6, as they are dropped into the cooking fluid.

The drum 8, is provided intermediate the guide grooves for the belt strands, with a series of radial paddle-like projections 14, which move concurrently or "pari passu"

with the belt 5 and serve as pushers for raising the articles from the fluid after cooking has been completed, and directing them to the upper run of the belt as clearly shown in Fig. I.

The trough is protected or closed by a cover 15, which is appropriately shaped in order that the vapor condensation may, by gravitation, find its way back into the trough. The cover is formed with an opening 16, through which the cooked articles are discharged, and an angular depression 17, for receiving them.

The operation of the apparatus is as follows:

The articles may be dropped or introduced into the cooking fluid in the enclosure as already indicated, and are directed or introduced beneath the drum 6 and the belt 5 by the incline 12. By reason of their buoyancy, they rise until they engage the under surface of the submerged course or lower run of the endless belt 5. Such articles as raw doughnuts or crullers, which are not initially buoyant, may, of course, sink upon the bottom of the tank at first; but as they quickly become buoyant under the heat of the liquor, they will soon rise to the conveyor 5.

By the contact thus established, the articles are carried along through the fluid whilst immersed therein as already noted. The speed of the belt 5, is so regulated as to afford the necessary time interval for proper cooking, the articles being kept completely submerged by the belt, during their progression thereby, substantially throughout the entire cooking period. When the articles reach the opposite end of the tray, they are successively engaged by the projections 14, of drum 7, adjacent the upward moving belt at its point of transition from its lower loaded course to its upper one, and are thereby lifted from the fluid and transferred or directed to the upper run of the belt. In accomplishing their allotted function, the projections are assisted by engagement of the articles with the rounded end 18, of the trough, which acts as a guide or deflector to prevent the articles from prematurely leaving the conveyor 5 at the end of its submerged course, in the manner clearly illustrated in Fig. I, and maintains the articles in proper relation to these pusher projections 14. In being carried along the inclined upward course of the upper or return run of the belt, the articles are given an opportunity to drain, so as to be comparatively dry when they are finally discharged through the opening 16, of cover 15 and reach the point of delivery to the discharge device which receives them from the conveyor. As shown, this discharge device is formed by the downward sloping side of the cover depression 17; and after rounding the drum 7, the articles slide into this angular depression 17, of the cover, from which they may be readily removed. If the temperature of the vapor and air in the enclosure is sufficient, the articles may, of course, undergo some cooking while draining and drying during their travel through the enclosure above the fluid.

The device may be of any width so that its capacity may be accordingly varied to suit any particular requirements in practice.

It is obvious that various changes may be made herein, both as to details and arrangement, without departing from the spirit of our invention.

Having thus described our invention, we claim:

1. In apparatus for cooking articles by contact with hot cooking fluid, the combination of means for introducing articles into the fluid; conveyor belt means for progressing the articles through the fluid completely submerged therein throughout the cooking period; and means for directing the articles in the fluid beneath said belt, so as to engage its under surface by virtue of their buoyancy and be carried along through the fluid.

2. In apparatus for cooking articles by contact with hot cooking fluid, the combination of conveyor belt means for progressing the articles through the fluid completely submerged therein throughout the cooking period; and means for directing the articles to be cooked into the fluid beneath said belt, so as to engage its under surface by virtue of their buoyancy and be carried along through the fluid.

3. In apparatus for cooking articles by contact with hot cooking liquor while completely submerged therein substantially throughout the cooking period, the combination of conveyor belt means for progressing and keeping the articles submerged in the liquor; and means for introducing the articles beneath said conveyor belt means, so as to engage the same by virtue of their buoyancy and be carried along through the liquor.

4. In apparatus for cooking articles by contact with hot cooking liquor while completely submerged therein substantially throughout the cooking period, the combination of conveyor belt means for progressing and keeping the articles submerged in the liquor; and means for introducing the articles into the liquor and beneath said conveyor belt means, so as to engage the same by virtue of their buoyancy and be carried along through the liquor; and for afterward elevating the articles out of the liquor.

5. In apparatus for cooking articles by contact with hot cooking fluid, the combination of conveyor belt means for progressing the articles through the fluid, said belt moving upward and out of the fluid at the end of the cooking course of the articles conveyed thereby; and paddle or pusher means adjacent the upward moving portion of the belt, for engaging the articles and lifting them from the fluid on to the portion of the belt above the fluid for conveyance thereby.

6. In apparatus for cooking articles by contact with hot cooking fluid, the combination of conveyor belt means for progressing the articles through the fluid completely submerged therein, said belt moving upward at the end of the cooking course of the articles conveyed thereby; means for directing the articles into the fluid beneath said belt, so as to engage its under surface by virtue of their buoyancy and be carried along through the fluid; and means including a stationary guide adjacent the upward moving portion of the belt for elevating the articles out of the fluid.

7. In apparatus for cooking articles by contact with hot cooking fluid, the combination of conveyor belt means for progressing the articles through the fluid; moving pusher means adjacent the upward moving portion of the belt for engaging the articles and lifting them from the fluid; and stationary guide means adjacent the path of said pusher means for maintaining the articles in proper relation thereto.

8. In apparatus for cooking articles by contact with hot cooking fluid, the combination of conveyor belt means for progressing the articles through the fluid, said belt moving upward and out of the fluid at the end of its cooking course; and a series of rotary pushers adjacent the upward moving portion of the belt, moving concurrently therewith, for lifting the articles from the fluid on to the portion of the belt above the fluid for conveyance thereby.

9. In apparatus for cooking articles by contact with hot cooking fluid, the combination of conveyor belt means for progressing the articles through the fluid; a rotary guide roll whereby said belt is directed upward at the end of its cooking course; a series of rotary pushers carried by said guide roll for engaging the articles and lifting them from the fluid; and stationary guide means adjacent the path of said pusher means for maintaining the articles in proper relation thereto.

10. An apparatus for cooking articles by contact with hot cooking fluid, comprising an endless belt conveyor for the articles having, in its loaded travel, a course below the level of the fluid for progressing the articles therethrough to be cooked thereby, and a return course extending above the level of the fluid for carrying the articles out of the same to a point of delivery.

11. An apparatus for cooking articles by contact with hot cooking liquor, comprising an endless belt conveyor for the articles having, in its loaded travel, a course below the level of the liquor for progressing the articles therethrough to be cooked thereby, and a return course extending above the level of the liquor for carrying the articles out of the same; and a depressor for engaging the articles at the end of the first mentioned conveyor course to prevent them from prematurely leaving the conveyor.

12. In apparatus for cooking articles by contact with hot cooking liquor while submerged therein substantially throughout the cooking period, the combination of conveyor belt means for progressing the articles through the liquor submerged therein, and engaged with such conveyor means by virtue of their buoyancy, and for thereafter elevating the articles out of and above the liquor to a point of delivery; and downward sloping discharge means receiving the articles from the conveyor means.

13. An apparatus for cooking articles by contact with hot cooking fluid, comprising an endless belt conveyor for the articles having, in its loaded travel, a course below the level of the fluid for progressing the articles therethrough to be cooked thereby, and an inclined upward return course for elevating the articles out of and above the fluid to a point of delivery; and a downward sloping discharge device receiving the articles from said conveyor.

14. A cooking apparatus, comprising a trough for cooking fluid; an endless belt traveling through the trough with its lower run disposed horizontally below the fluid level and its upper or return run above the fluid level; means for directing the articles to be cooked beneath the lower run of the belt so that said articles shall be progressed through the trough whilst submerged in the fluid; and means for thereafter directing the articles to the upper run of the belt so that said articles shall be permitted to drain before being discharged from the apparatus.

15. An apparatus for cooking articles by contact with hot cooking fluid, comprising an endless belt conveyor for the articles having, in its loaded travel, a course below the level of the fluid for progressing the articles therethrough to be cooked thereby, and an upward course for carrying the articles out of the fluid to a point of delivery; rotary pusher means at the transition of the belt from its lower to its upper course for transferring the articles from the former to the latter; and guide means co-operating with said pusher means in said transfer.

16. A cooking apparatus comprising a trough for a cooking fluid; an endless belt traveling partly above and partly below the level of the fluid, said belt comprising a series of spaced strands; grooved drums for the belt; means for directing the articles to be cooked beneath the submerged portion of the belt so as to be progressed thereby through the cooking fluid; a series of projections formed upon one of said drums, operative between the strands of the belt, and functional in raising the articles from the cooking fluid and directing them to the portion of said belt above the fluid, to permit draining preparatory to discharge from the apparatus.

17. Cooking apparatus of the character described comprising a closed receptacle adapted to contain hot cooking liquor; and means for conveying articles to be cooked through the enclosure below the liquor level, and for thereafter conveying them through the enclosure above the liquor level.

18. Cooking apparatus of the character described comprising a closed receptacle adapted to contain hot cooking liquor; and conveyor belt means for progressing articles to be cooked through the liquor submerged therein, and for thereafter conveying them through the enclosure above the liquor.

19. Cooking apparatus of the character described comprising a closed receptacle adapted to contain hot cooking liquor; and an endless belt conveyor for articles to be cooked having, in its loaded travel, a course below the level of the liquor for progressing the articles therethrough, and a return course for conveying the articles through the enclosure above the liquor.

In testimony whereof, we have hereunto signed our names at Philadelphia, Pennsylvania, this fourth day of June, 1919.

CECIL H. SHERMAN.
FRANK ELLIS MORRIS.

Witnesses:
JAMES H. BELL,
E. L. FULLERTON.

Certificate of Correction.

It is hereby certified that Letters Patent No. 1,414,713, granted May 2. 1922, upon the application of Cecil H. Sherman and Frank Ellis Morris, of Philadelphia, Pennsylvania, for an improvement in "Cooking Apparatus," were erroneously issued to "John C. Bergner and Frank Ellis Morris," whereas said Letters Patent should have been issued to *Display Doughnut Machine Corporation, a Corporation of New York*, as assignee, by mesne assignments, of the entire interest in said invention, as shown by the records of assignments in this office; and that the said Letters Patent should be read with this correction therein that the same may conform to the record of the case in the Patent Office.

Signed and sealed this 20th day of June, A. D., 1922.

[SEAL.]

KARL FENNING,
*Acting Commissioner of Patents.*